United States Patent
Schofield

(12) 
(10) Patent No.: US 6,345,445 B1
(45) Date of Patent: *Feb. 12, 2002

(54) LOPPING TOOL AND METHOD FOR LOPPING

(75) Inventor: Robert T. Schofield, Madison, WI (US)

(73) Assignee: Alterra Holdings Corporation, Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,295

(22) Filed: Jul. 8, 1997

Related U.S. Application Data

(63) Continuation of application No. 08/511,926, filed on Aug. 7, 1995, now abandoned.

(51) Int. Cl.[7] .............................................. B26B 13/00
(52) U.S. Cl. ............................ 30/249; 30/245; 30/258; 30/272.1
(58) Field of Search .......................... 30/131, 244, 748, 30/449, 245, 251, 272.1, 275.4, 796.1

(56) References Cited

U.S. PATENT DOCUMENTS

| | | | |
|---|---|---|---|
| 873,227 A | * 12/1907 | Grover | 30/272.1 X |
| 978,574 A | * 12/1910 | Frumviller | 30/249 |
| 1,374,768 A | * 4/1921 | Ruppert | 30/249 |
| 1,801,675 A | 4/1931 | Maguire | |
| 2,259,642 A | 10/1941 | Hoyt | |
| 2,569,888 A | * 10/1951 | Gustafson | 30/249 X |
| 2,616,741 A | 11/1952 | Ziese | |
| 2,704,052 A | 3/1955 | Wood | |
| 2,744,322 A | * 5/1956 | Gustafson | 30/249 X |
| 3,284,114 A | 11/1966 | McCord, Jr. et al. | |
| 3,292,591 A | 12/1966 | Wood | |
| 3,317,997 A | 5/1967 | Hedstrom et al. | |
| 3,360,858 A | * 1/1968 | Cowley | 30/249 |
| 3,835,535 A | * 9/1974 | Robison et al. | 30/249 X |
| 4,654,971 A | 4/1987 | Fettes et al. | |
| 4,760,645 A | * 8/1988 | Davis | 30/249 |
| 4,924,573 A | 5/1990 | Huddleston | |
| 5,084,975 A | 2/1992 | Melter | |
| 5,099,539 A | 3/1992 | Forester | |
| 5,228,202 A | * 7/1993 | Liao | 30/249 X |
| 5,241,752 A | 9/1993 | Lutzke et al. | |
| 5,367,773 A | * 11/1994 | Robbins | 30/275.4 X |

FOREIGN PATENT DOCUMENTS

GB 2266682 A * 11/1993

* cited by examiner

Primary Examiner—Boyer Ashley
(74) Attorney, Agent, or Firm—Foley & Lardner

(57) ABSTRACT

A tool for performing lopping, pruning and similar operations includes a tool support, a tool head, an actuating line and an actuating handle. The tool support preferably includes a pair of telescoping tubes and the tool head includes a blade movable to perform cutting operations. The blade is coupled to the actuating line and remotely movable by tensioning the actuating line. The actuating line passes through a portion of the tool support to the actuating handle. The actuating handle includes a line engagement mechanism or clutch assembly that engages and holds the line when the actuating handle is slid on the tool support. The tool is actuated by a first movement of the actuating handle that causes the engagement mechanism to engage the actuating line, followed by a second movement that tensions the line to move the blade. A reel mechanism below the engagement mechanism collects the actuating line when the tool support is retracted and dispenses line when the tool support is extended.

16 Claims, 6 Drawing Sheets

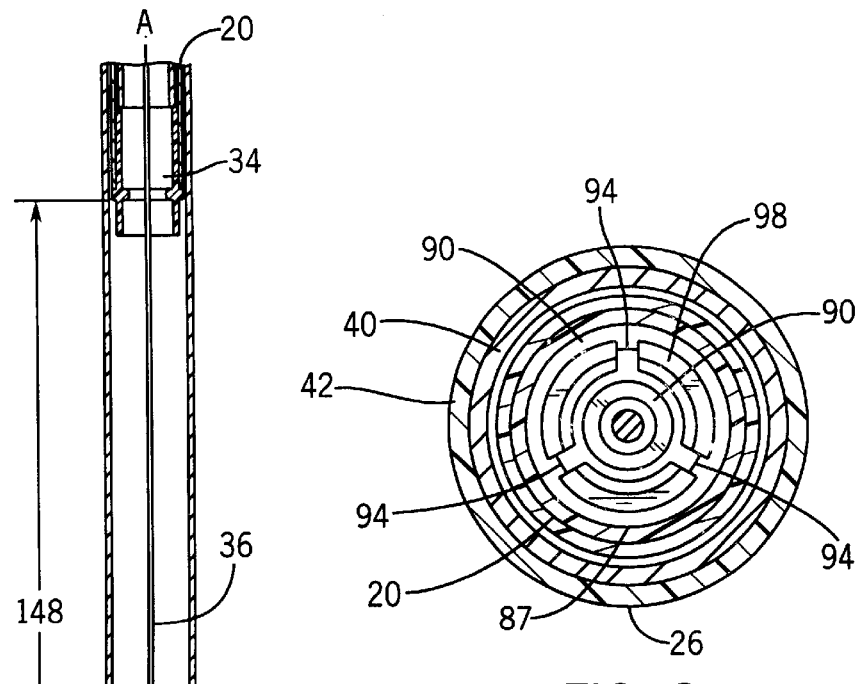
FIG. 8
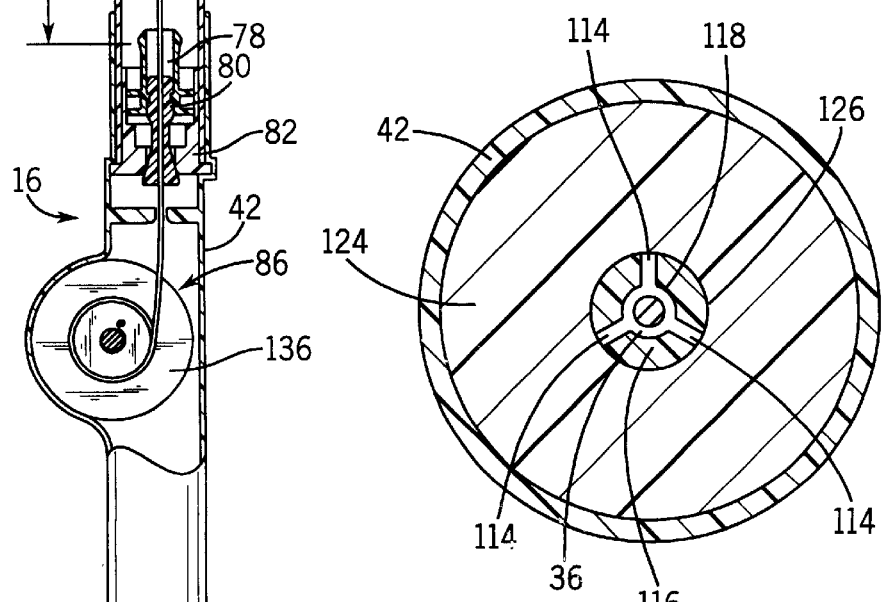
FIG. 7
FIG. 9

LOPPING TOOL AND METHOD FOR LOPPING

Cross-Reference to Related Applications

This is a continuation application of co-pending U.S. patent application Ser. No. 08/511,926 of Robert T. Schofield filed Aug. 7, 1995, which is hereby abandoned.

BACKGROUND OF THE INVENTION

The present invention relates generally to the art of lopping and pruning tools, particularly of the type including a pole or tubular tool support for reaching high branches and the like. More particularly, the invention relates to an improved telescoping lopper having an actuating arrangement that may be grasped in one hand for trimming relatively small branches, or in two hands where additional force is required for cutting larger branches. The invention also relates to a method for lopping including two movements of an actuator, a first engaging an actuating line and a second tensioning the line to move a blade to perform a desired cutting operation.

A great number and variety of devices have been proposed and are commercially available for lopping or pruning branches, limbs and the like. One type of lopping device, particularly suited to trimming high branches, includes a elongated shaft or tube on the upper end of which a lopping mechanism is mounted. The lopping mechanism includes a hook-shaped jaw and a pivotal blade. The blade is typically biased in an open position by a spring, and includes a lever arm extension attached to a cord or rope. To sever a tree branch or other object, a user places the jaw about the object and pulls the actuating cord to pivot the blade toward the jaw. A lopper generally of this type is described in U.S. Pat. No. 5,241,752, issued on Sep. 7, 1993 to Lutzke et al. and assigned to Fiskars Oy Ab.

Certain known lopping tools of this type have a shaft comprised of telescoping poles or tubes lockable with respect to one another in extended positions, greatly extending the reach of the device and allowing the user to trim high branches. A device of this type is described in U.S. Pat. No. 2,259,642, issued on Nov. 6, 1941 to Hoyt. In addition, such tools often include implements other than the jaw and blade structure, such as a saw, thereby adding to the utility and versatility of the device (see, e.g. U.S. Pat. No. 5,241,752 mentioned above).

Despite these improvements, known pruning and lopping tools can be difficult to use in many situations. One inconvenience associated with known lopping tools is that they require the user to hold and stabilize the shaft supporting the lopping head in one hand, while pulling the cord or cable to actuate the lopping tool with the other hand. With this type of lopper, when the user desires to cut tough or large diameter tree limbs and branches, the user may not be able to pull downwardly on the cord with sufficient force to sever the limb. Improvements in such devices have been proposed, such as that disclosed in U.S. Pat. No. 2,259,642, to facilitate holding the actuating cord, but nevertheless require the user to grasp the cord and hold it throughout the cutting operation.

Another inconvenience of many known lopping tools is a tendency for the actuating cords to become entangled. In most known lopping tools an actuating cord simply dangles from the lopping head and must be manually secured by the user prior to and throughout the cut. The cord typically hangs along side of the tool shaft where it can easily become entangled in branches and twigs surrounding the tool during use. In addition, for tools supported on telescoping tubes or shafts, excess cord typically dangles or is trailed below the shaft when the tool is collapsed (i.e. when the tubes are telescopingly retracted), such as for a low pruning task or for storing the tool, again making the cord susceptible to entanglement.

Lopping and pruning devices have been proposed that avoid the entanglement and cord tensioning problems mentioned above by passing one or more actuating cords or cables through the interior of a hollow telescoping shaft. In one device of this type, described in U.S. Pat. No. 5,084,975, issued on Feb. 4, 1992 to Melter and assigned to Fiskars Oy Ab, a pair of internal cables are coupled between an actuator and a shears. A compensating pulley permits extension of the telescoping tubes, while ensuring sufficient tension on the cord when a user desires to make a cut. However, the particular actuating arrangement of the tool generally does not permit a user to apply a maximum of actuating force to complete a difficult cut.

There is a need, therefore, for an improved lopping tool that avoids the inconveniences of currently available devices. In particular, there is a need for an extensible lopping tool that permits a user to exert force for completing a cut with both hands when necessary. There is also a need for an extensible lopping tool equipped with a system to collect and store excess actuating cord or cable, such as when the tool support is collapsed or stored, and to readily draw upon the stored cord or cable when needed to extend the support handle. In both cases, the improved tool should be of relatively simple, thereby permitting cost effective manufacture and improving, or at least maintaining, the useful life of the tool.

SUMMARY OF THE INVENTION

The present invention provides an innovative tool for lopping, trimming and pruning designed to respond to the needs identified in the foregoing. The tool features an extensible support tube through which an actuating cord or cable passes. The cable is associated with a clutch mechanism that permits unimpeded movement of the cable as the support tube is extended and retracted, but that engages the cable to actuate the lopper when a user displaces an actuating handle with respect to the support tube. The cable is conveniently collected and stored by a reel mechanism housed in the actuating handle. The actuating handle is moved through a first distance to engage the cable, then through a second distance to actuate the lopper. Because the actuating handle both causes actuation of the clutch mechanism and draws the cable to perform the cutting operation, a user may actuate the tool with one hand for less difficult cuts or apply a greater force on the handle with both hands when necessary. The clutch is automatically released and the cable collected after each cut.

Thus, in accordance with a first aspect of the invention, a tool for performing lopping, trimming, pruning and similar cutting operations includes an elongated tool support, a tool head, an actuating line and an actuating handle. The tool support has a central cavity extending at least partially through it and the tool head, including a cutting blade, is supported on its upper end. The actuating line is coupled to the tool head and is tensionable to move the cutting blade. The actuating line passes through at least a portion of the central cavity of the tool support. The actuating handle is coupled to the lower end of the tool support and includes an actuating line engagement mechanism. The engagement mechanism engages the actuating cable by a first movement of the actuating handle and tensions the actuating cable to move the cutting blade by a second movement of the actuating handle.

In accordance with another aspect of the invention, a tool includes an elongated, telescoping, extensible and retractable tool support having a central cavity extending at least partially therethrough. A severing tool is supported on the upper end of the tool support and includes a blade movable to perform a cutting operation. An actuating line is coupled to the severing tool and is tensionable to move the blade to perform the cutting operation. The actuating line extends through at least a portion of the central cavity of the tool support toward the lower end of the tool support. An actuating mechanism is provided for selectively engaging and tensioning the actuating line. A reel mechanism is disposed adjacent to the lower end of the tool support and is coupled to the actuating line. The reel mechanism collects the actuating line upon retraction of the tool support and dispenses the actuating line upon extension of the tool support.

In accordance with a further aspect of the invention, a tool includes an elongated tool support, a tool head, an actuating line and an actuating handle. The actuating handle is coupled to the lower end of the tool support and to the actuating line, the line passing at least through a portion of a central cavity in the tool support. The actuating handle is slidable with respect to the tool support in a first direction to tension the actuating line and move the blade to perform a cutting operation. The actuating handle can be slid in a second direction to relax the actuating line.

In accordance with still another aspect of the invention, a convenient method is provided for actuating a cutting tool of the type having an elongated tool support, a tool head secured to an upper end of the tool support and including a movable blade, an actuating line coupled to the tool head and tensionable to move the blade, and an actuating member mounted on a lower end of the tool support and coupled to the actuating line to selectively move the blade. The method includes a first step of moving the actuating member through a first distance in a predetermined direction with respect to the tool support to engage the actuating line. With the actuating line thus engaged, the method includes a second step of moving the actuating member through a second distance in the predetermined direction to tension the actuating line and thereby to perform the desired cutting operation.

BRIEF DESCRIPTION OF THE DRAWINGS

The present invention will become more fully understood from the following detailed description, taken in conjunction with the accompanying drawings, wherein like reference numerals refer to like parts, in which:

FIG. 7 is a sectional detail view of the actuating handle of FIG. 5, showing the internal elements in a fully actuated position;

FIG. 8 is a sectional view of the actuating handle of FIG. 5 along line 8—8; and FIG. 9 is a sectional view of the actuating handle of FIG. 5 along line 9—9.

DESCRIPTION OF THE PREFERRED EMBODIMENTS

Figure 1:
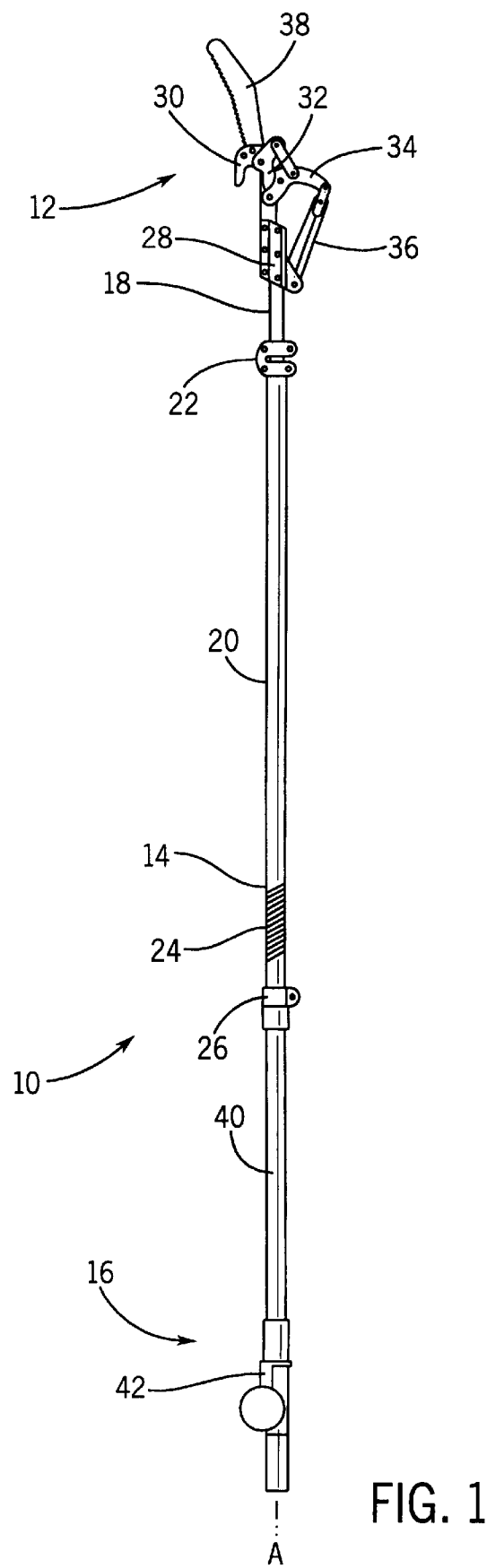
FIG. 1 is an overall side elevational view of an exemplary lopping tool in accordance with the invention.
Figure 2:
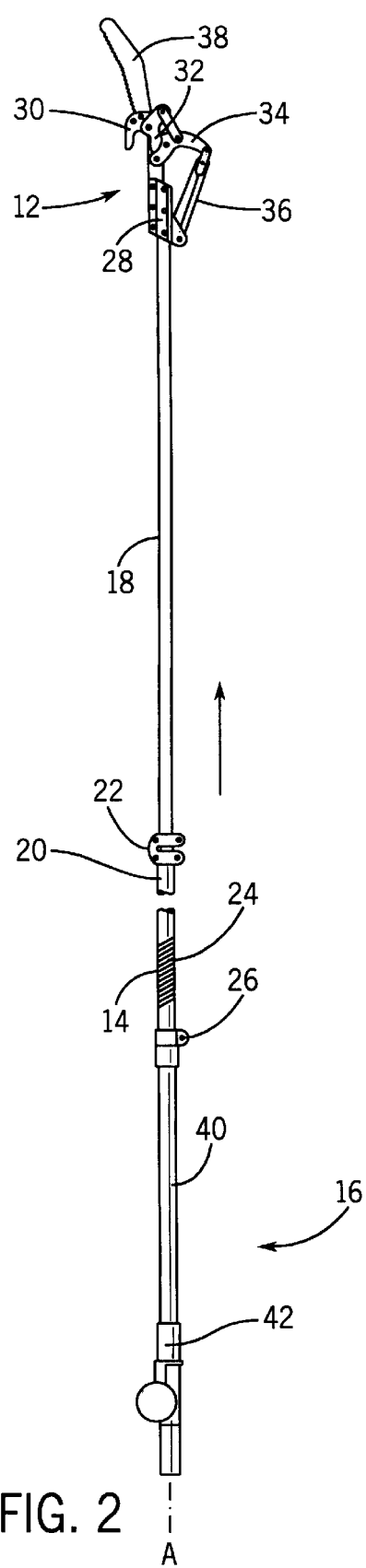
FIG. 2 is a side elevational view of the lopping tool of FIG. 1, illustrating the tool support in its extended position.

Turning now to the drawings and referring to FIG. 1, a tool 10 for performing lopping, trimming and pruning operations includes a tool head 12, a telescoping tool support 14 and an actuating handle 16. Tool support 14 is preferably a hollow tubular structure comprising an upper tube 18 slidingly received within a lower tube 20. A securing collar or clamp 22 is provided on an upper end of lower tube 20 for setting and maintaining tool support 14 at a desired length. Thus, collar 22 may be loosened around upper tube 18 to permit tube 18 to be slid into a desired position extending from lower tube 20 as shown in FIG. 2. Once tube 18 is in the desired position, collar 22 may be tightened around tube 18 to secure and maintain the position. Collar 22 may be of generally known design, such as the clamp described in U.S. Pat. No. 5,084,975, which is hereby incorporated herein by reference.

Tool support 14 has a gripping area 24 that may includes a textured grip formed on or added to the outside surface of lower tube 20. Grip 24 is located just above actuating handle 16 so that grip 24 and actuating handle 16 may be grasped simultaneously by a user, such as for cutting small branches and limbs as will be described more fully below. A similar grip (not shown) may be formed on the outer surface of actuating handle 16. A stop collar or clamp 26, which may be generally similar to collar 22, is provided on an upper end of actuating handle 16. Collar 26 permits a user to lock actuating handle 16 in position with respect to lower tube 20, thereby preventing lopping actuation of tool 10.

As illustrated in the FIGURES, tool head 12 is supported on an upper end 28 of tool support 14. Tool head 12 includes at least a severing tool for performing lopping, pruning and similar operations. In the preferred embodiment illustrated, tool head 12 includes a hook-shaped jaw 30 coupled to a movable blade 32. As with conventional lopping tools, jaw 30 may be placed around a limb or branch to be cut and blade 32 moved toward jaw 30 to sever the branch. Blade 32 is fixed to an actuating lever 34 that, in turn, is moved by tensioning a flexible actuating line 36 as described below. Tool head 12 may conveniently include additional tools, such as a saw 38.

Externally, actuating handle 16 presents an actuating tube 40 coupled to a lower handle housing 42. Actuating tube 40 and handle housing 42 are fixed with respect to one another during assembly of tool 10. In the presently preferred embodiment, handle housing 42 includes two mirror-image shell halves fitted over actuating tube 40 as described below. As indicated by line A in the FIGURES, tool support 14 and actuating handle 16 share a common longitudinal axis. Internally, actuating handle 16 is coupled to actuating line 36, which passes from tool head 12 through the interior of tool support 14.

Figure 3:
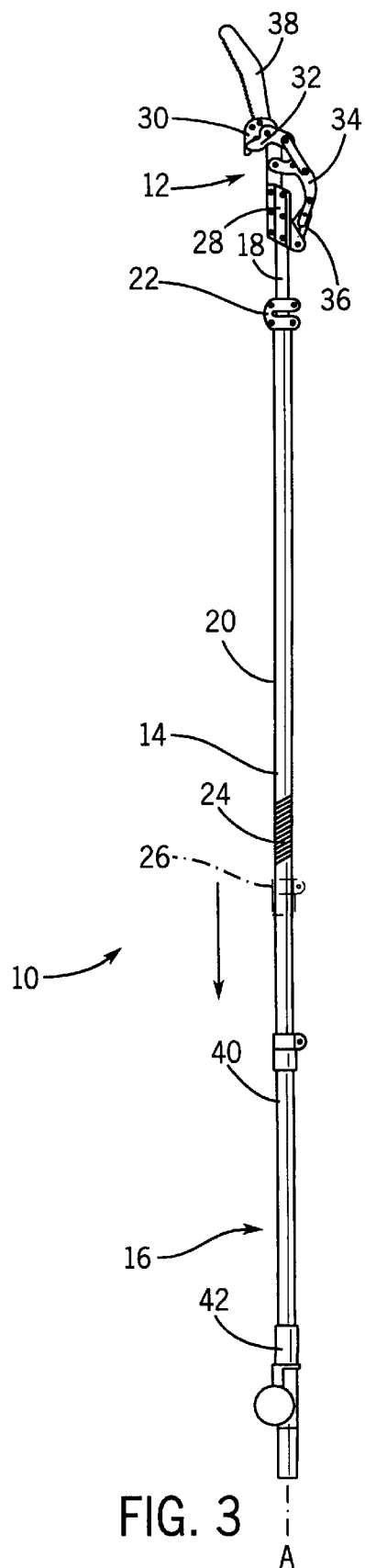
FIG. 3 is a side elevational view of the lopping tool of FIG. 1, showing the actuating handle slid into its fully actuated position for performing a cutting operation.

As illustrated in FIG. 3, a lopping operation is carried out by tool 10 by actuating or drawing actuating handle 16 downwardly, away from the tool head 12. As will be described in greater detail below, downward movement of actuating handle 16 causes actuating tube 40 to slide along longitudinal axis A with respect to tool support 14. In a first phase of this motion, actuating handle 16 seizes or engages actuating line 36, while in a second phase of motion handle 16 tensions or pulls actuating line 36 downwardly, resulting in pivotal movement of blade 32 toward jaw 30, performing a desired lopping operation. When a user desires to cut a small or thin branch offering little resistance to blade 32, the user may grasp grip 24 of tool support 14 in one hand and actuating tube 40 in the other hand to displace handle 16 with respect to support 14 for cutting. However, for larger or more difficult cuts, the user may grasp actuating tube 40 with both hands to exert additional force on blade 32 through actuating line 36. Because actuating handle 16 moves along tube support 14, tool 10 is inherently stabilized by the user's hold on handle 16, freeing the user to concentrate on performing the cutting operation without the distractions of handling the actuating line, stabilizing the tool, or avoiding entanglement of line 36.

Figure 4:
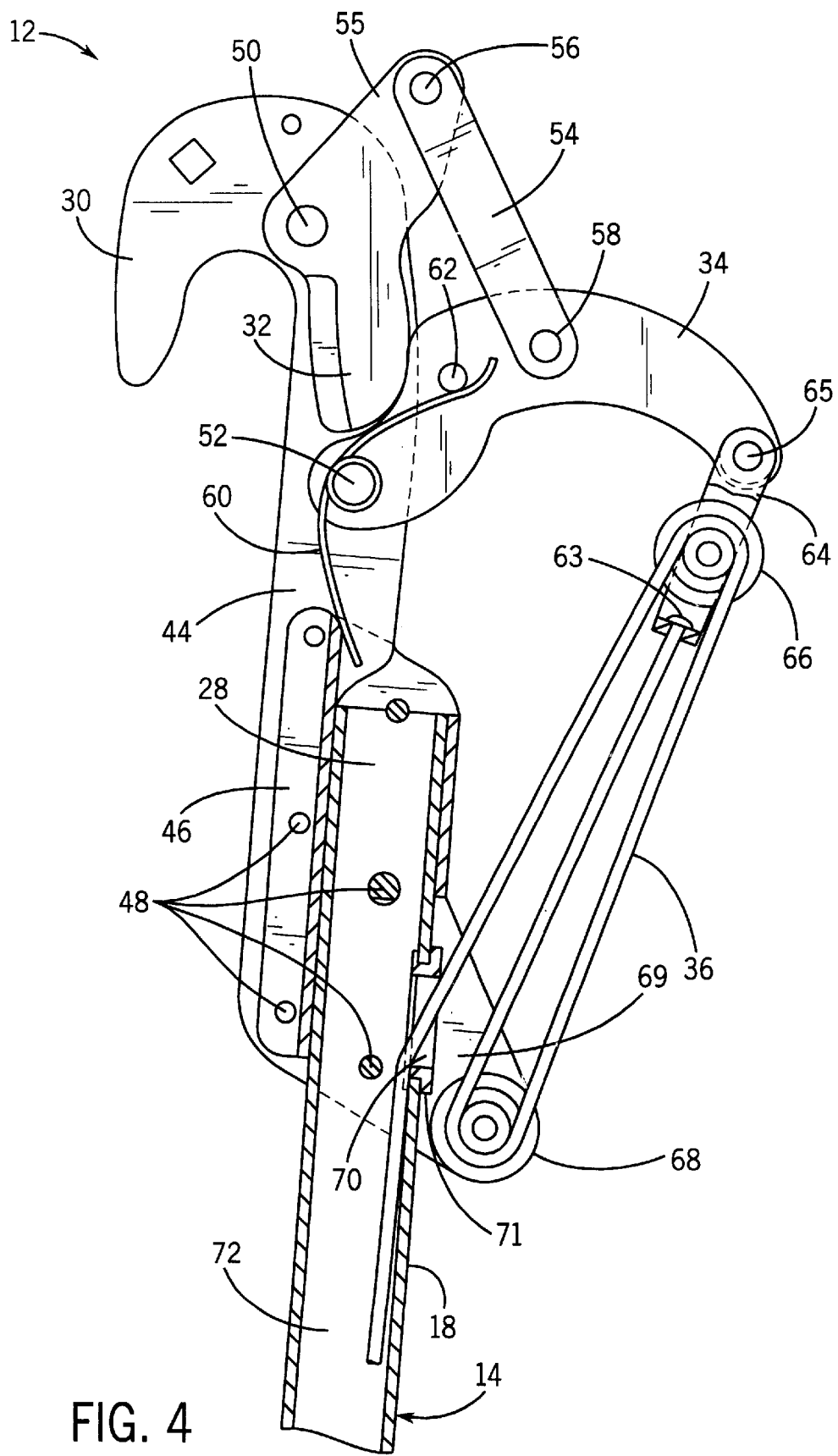
FIG. 4 is a partial sectional view of the tool head of the device shown in FIG. 1, illustrating an exemplary configuration of the actuating and cutting elements of the tool head.

The presently preferred configuration of tool head 12 is illustrated in FIG. 4. Tool head 12 includes jaw 30 formed integrally with a support extension or shank 44. Shank 44 is fixed to the upper end 28 of upper tube 18 via a bracket 46 and rivets 48, or similar fasteners. Blade 32 is mounted on shank 44 by means of a rivet 50 that holds blade 32 firmly against jaw 30 while permitting blade 32 to pivot toward jaw 30. Below blade 32, actuating lever 34 is pivotally supported on shank 44 by a bolt 52 held in place by a mating nut (not shown). An actuation link 54 is secured between an extension 55 from blade 32 and actuating lever 34. Link 54 is pivotally coupled to extension 55 and to lever 34 by rivets 56 and 58, such that downward pivotal movement of actuating lever 34 draws link 54 downwardly, resulting in rotation of blade 32 toward jaw 30. Thus, blade 32 is moveable between an open position, shown in FIG. 4, and a closed or cutting position (see FIG. 3) by downward movement of lever 34. Lever 34 is biased into the open position by a torsion spring 60 mounted on bolt 52 and extending between bracket 46 and a stud or rivet 62 on lever 34.

Actuating lever 34 is coupled to actuating line 36 for remotely controlling movement of blade 32 by movement of actuating handle 16. While actuating line 36 could be directly coupled to actuating lever 34, it is preferably directed around pulleys to compound the tensile force exerted on line 36 by a user. Thus, as shown in FIG. 4, an end 63 of actuating line 36 is secured to a pulley carrier 64 pivotally held on actuating lever 34 by a rivet 65. Pulley carrier 64 supports an upper pulley 66, while a lower pulley 68 is held on a lower extension 69 of shank 44. From pulley support 64, line 36 is looped around lower pulley 68, then around upper pulley 66, before extending downwardly to upper end 28 of tube 18. Line 36 enters into upper end 28 through an opening 70, preferably surrounded by a grommet 71 to protect line 36 and tube 18 from excessive wear. From opening 70, actuating line 36 extends downwardly through a central cavity 72 in tool support 14.

Figure 5:
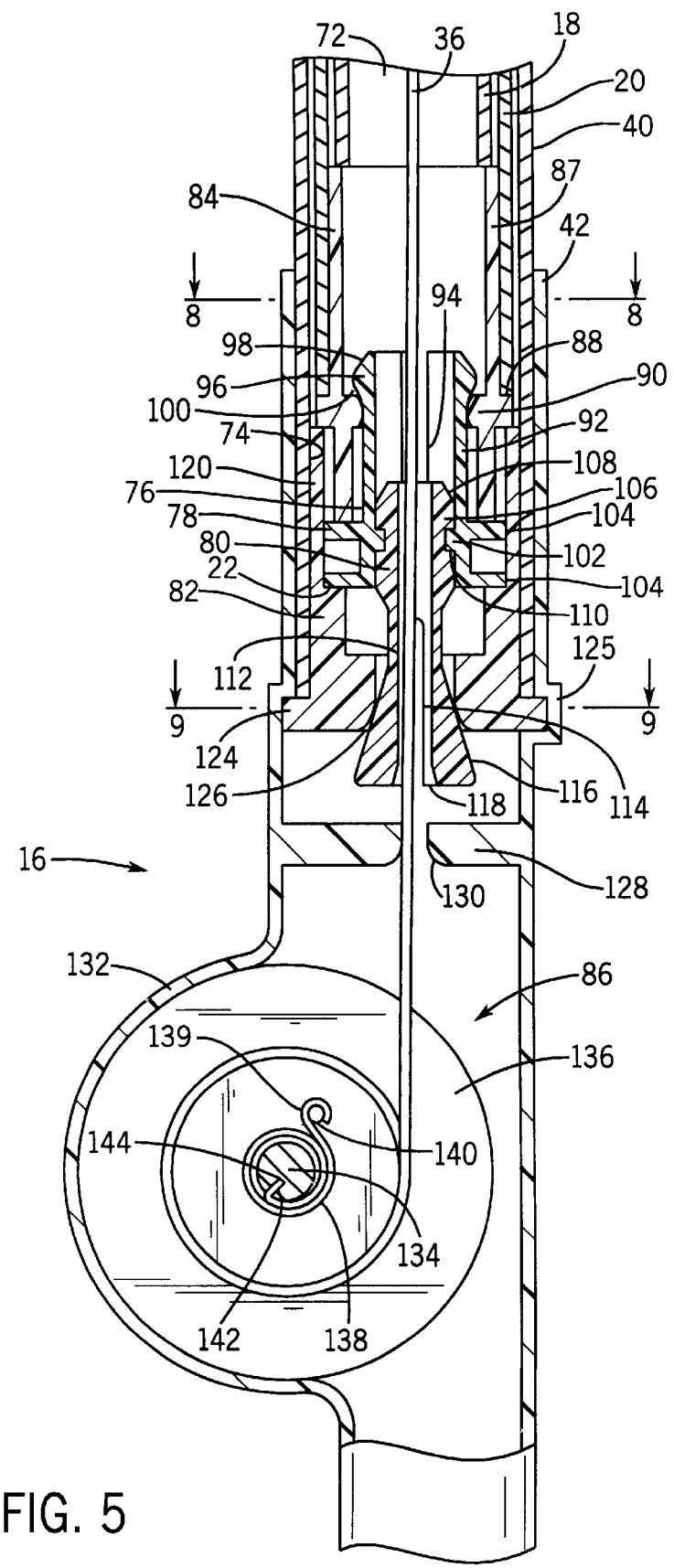
FIG. 5 is a sectional detail view of the actuating handle of the tool shown in FIG. 1, illustrating the internal elements that engage and tension the actuating line, in their non-actuated position.
Figure 6:
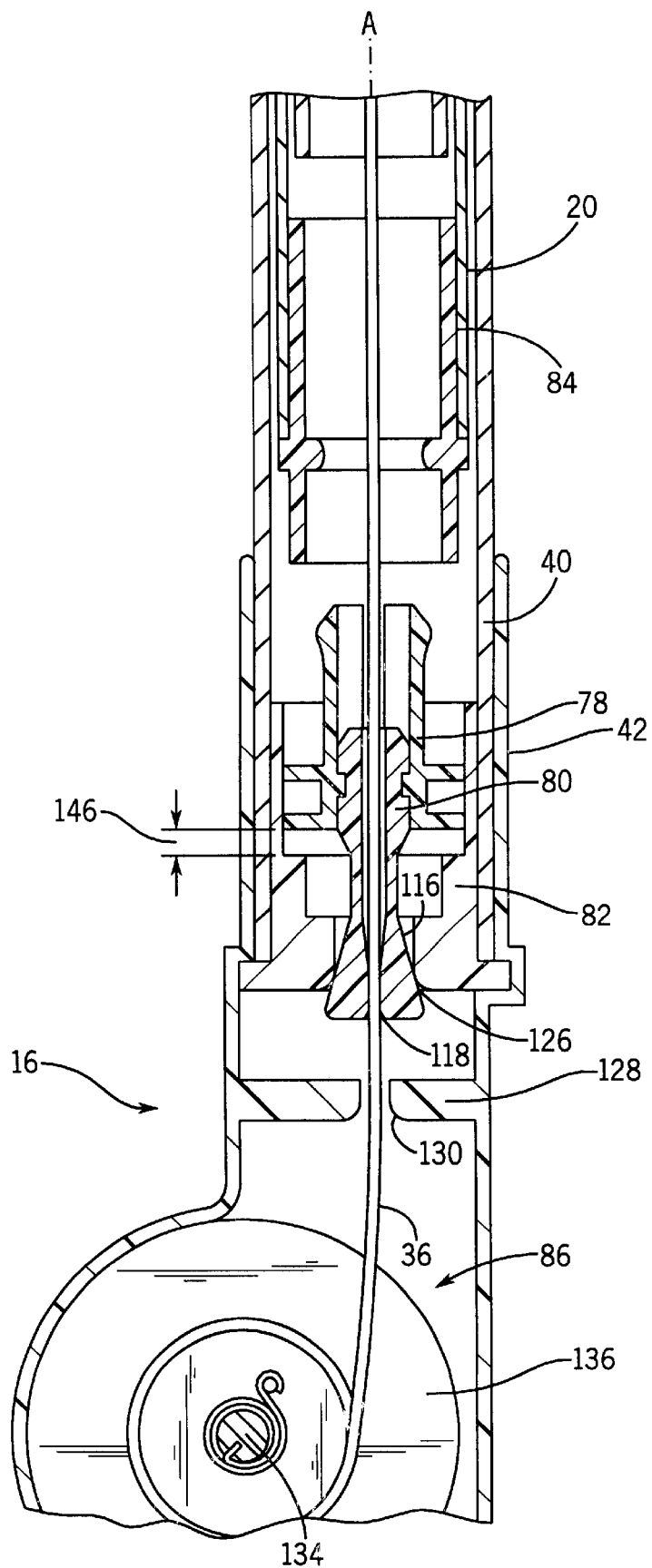
FIG. 6 is a sectional detail view of the actuating handle of FIG. 5, showing the internal elements of the handle in a partially actuated position.

As discussed above, an advantage of the preferred configuration of tool 10 resides in its ability to engage actuating line 36 by a first movement of actuating handle 16 and to actuate or move blade 32 toward jaw 30 to execute a desired cutting operation by a second, further movement of handle 16. FIGS. 5, 6 and 7 illustrate the preferred internal configuration of actuating handle 16 that facilitates this aspect of tool 10. As shown in the FIGURES, actuating handle 16 includes a clutch or line engagement mechanism, designated generally by the reference numeral 74, including a shuttle 76 comprising a plug 78 and collet 80, a jam 82 and a clutch actuator 84. A reel mechanism 86 is also provided in handle housing 42 to collect and dispense actuating line 36 as discussed below.

As best illustrated in FIGS. 5 and 6, upper tube 18 is slidably received in lower tube 20, which is, in turn, slidable within actuating tube 40. Clutch actuator 84 includes a cylindrical wall portion 87 and an annular shoulder 88 in abutment with a lower end of lower tube 20. Clutch actuator 84 is fixed with respect to lower tube 20 during assembly of tool 10, such as by gluing wall portion 87 within lower tube 20. Clutch actuator 84 includes an annular, reduced diameter triggering ring 90 extending inwardly for triggering collet 80 to engage actuating line 36 as described below.

Plug 78 includes a generally cylindrical upper wall 92 in which at least one elongated slot 94 is formed. Slot 94 permits upper wall 92 to be squeezed or compressed radially during actuation of tool 10. In an upper region of plug 78, an annular protrusion extends outwardly to form an upper inclined abutment surface 98 and a lower inclined abutment surface 100. Abutment surfaces 98 and 100 cooperate with triggering ring 90 upon movement of actuating handle 16 as discussed below. Adjacent to a lower region, plug 78 further includes an inner annular retaining ring 102 for securing collet 80 in its assembled position, as well as a pair of guide rings 104 for guiding shuttle 76 through upward and downward movement.

In the presently preferred configuration illustrated, collet 80 includes a head section 106 having an annular, inclined upper edge 108 for facilitating insertion of head section 106 into plug 78 during assembly. Head section 106 of collet 80 also includes an annular groove 110 located and dimensioned to receive retaining ring 102 of plug 78, thereby maintaining plug 78 and collet 80 interconnected. Collet 80 further includes a tail section 112 extending downwardly from head section 106. At least one elongated groove 114 is formed in tail section 112, permitting tail section 112 to be squeezed or compressed radially to engage and seize actuating line 36 as described below. Tail section 112 terminates in a frustoconical or wedge-shaped lower portion 116 having an interior surface 118 adapted to contact actuating line 36 during actuation of tool 10.

Jam 82 partially surrounds and cooperates with plug 78 and collet 80 during actuation of tool 10. Thus, jam 82 includes a generally cylindrical upper wall portion 120 in contact with guiding rings 104 of plug 78, and an annular shoulder 122 on which plug 78 rests in the non-actuated position illustrated in FIG. 5. In a bottom region, jam 82 includes an annular locating ring 124 designed to cooperate with a recess 125 formed within handle housing 42 to hold jam 82 solidly in place throughout actuation of tool 10. An internal bore 126 is formed in jam 82 for contacting lower portion 116 of collet 80 as described below.

Clutch mechanism 74 is assembled as follows. First, head section 106 of collet 80 is slipped through bore 126 of jam 82. Next, plug 78 is inserted into upper wall portion 120 of jam 82 and is snapped into engagement with head section 106 of collet 80. As mentioned above, inclined upper edge 108 of collet 80 facilitates its insertion in plug 78 and the cooperation of ring 102 with groove 110 maintains plug 78 and collet 80 interlocked. Jam 82, plug 78 and collet 80 are then placed in one shell half of handle housing 42 by pressing locating ring 124 of jam 82 into recess 125. Jam 82 may be secured in handle housing 42 by additional means, such as by gluing upper wall portion 120 to handle housing 42. Actuating tube 40 is inserted into handle housing 42 and fixed within handle housing 42 above locating ring 124, such as by gluing. Separately, clutch actuator 84 is fixed to lower tube 20, such as by gluing wall portion 87 within tube 20. After assembly of reel mechanism 86 as described below, handle housing 42 is covered by a mating shell half (not shown) and lower tube 20 is inserted into actuating tube 40 and slid downwardly until triggering ring 90 snaps into engagement with protrusion 96 of plug 78.

As shown in FIG. 8, the resulting assembly comprises housing 42 and tube 40 nested and fixed to one another, and lower tube 20 slidably received in actuating tube 40 and fixed to clutch actuator wall 87. Upper inclined surface 98 of plug 78 extends above triggering ring 90 and slots 94 extend radially therefrom. Collet 80 is fixed within plug 78. Actuating line 36 extends freely through the center of the assembly. As shown in FIG. 9, locating ring 124 is lodged within handle housing 42, and lower portion 116 of collet 80 extends through bore 126 with slots 114 extending radially therefrom. Actuating line 36 extends through engagement surface 118 of collet 80.

Returning to FIG. 5, handle housing 42 includes, below recess 125, an annular rib 128 having a central opening 130 for guiding actuating line 36 toward collet 80. Below annular rib 128, handle housing 42 forms an enlarged housing 132 for receiving reel mechanism 86, as well as a support axle 134 for holding mechanism 86. Reel mechanism 86 includes a take-up reel or bobbin 136 rotationally mounted on axle 134 for storing actuating line 36. A flat coil biasing spring 138 is wound within bobbin 136 and includes a hook-shaped end 139 bearing against an appropriate spring engagement pin 140 on bobbin 136 and a tang-shaped attachment end 142 inserted and secured in an appropriate slot 144 in axle 134.

During assembly of tool 10, actuating line 136 is wound on bobbin 136 and bobbin 136 is placed within handle housing 42 as shown. With clutch mechanism 74 assembled as described above, actuating line 136 is fed from bobbin 136 through bore 130 and up through collet 80, actuator 84 and lower and upper tubes 20 and 18. At upper end 28 of upper tube 18, actuating line 36 is removed through opening 70 (see FIG. 4), fed through pulleys 66 and 68, and attached to pulley support 64. Handle housing 42 is then closed to cover clutch mechanism 84 and reel mechanism 86.

Tool 10 operates as follows. From the collapsed position shown in FIG. 1, upper tube 18 may be extended or retracted to a desired height and fixed with respect to lower tube 20 by setting clamp 22. During extension of tubes 18 and 20, reel mechanism 86 dispenses actuating line 36 from bobbin 136 through clutch mechanism 74 and tubes 20 and 18, maintaining actuating line 36 taut, but with insufficient tension to move blade 32 toward jaw 30. As tube 18 is retracted within tube 20, reel mechanism 74 collects actuating line 36 on bobbin 136, again without actuating blade 32.

When a user desires to lop a branch or the like, tool 10 is positioned such that jaw 30 partially surrounds the branch, and actuating handle 16 is slid on tube 20 along axis A in a direction away from tool head 12, as shown in FIGS. 6 and 7, typically downwardly when the user is positioned below the object being severed. As handle 16 is moved downwardly through a first distance 146 (see FIG. 6), triggering ring 90 contacts lower inclined surface 100 of plug 78, pulling plug 78 and collet 80 upwardly within jam 82 and compressing wedge-shaped lower portion 116 of collet 80 within bore 126 of jam 82 until interior surface 118 engages actuating line 36. Once collet 80 has engaged line 36, further movement of actuating handle 16 causes triggering ring 90 to compress upper wall 92 of plug 78 until ring 90 escapes plug 78. Once collet 80 is thus engaged on actuating ling 36, it remains in this engaged position, preventing reel mechanism 86 from dispensing additional line, thereby tensioning actuating line 36. As actuating handle 16 is moved further downwardly, tension on actuating line 36 causes actuating lever 34 to pivot downwardly, moving blade 32 toward jaw 30. Full actuation of tool 10 occurs as actuating handle 16 is displaced over a distance 148, as indicated in FIG. 7.

After a cutting operation has been completed, actuating handle 16 is slid upwardly over lower tube 20. This motion eventually causes triggering ring 90 of clutch actuator 84 to contact upper inclined surface 98 of plug 78. Force exerted on surface 98 by ring 90 causes plug 78 and collet 80 to be displaced downwardly, dislodging lower portion 116 of collet 80 from jam 82 and thereby releasing actuating line 36. Reel mechanism 86 then takes up any slack in line 36.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, variants on the engagement mechanism discussed above may be envisioned, such as a structure including one or more cam-type or cleat-type elements that squeeze or jam the actuating line during the first phase of motion of the actuating handle. Moreover, certain of the advantages flowing from the preferred embodiment described above may be attained through the use of a manually engageable clutch or clamping device.

I claim:
1. A tool for performing cutting operations, comprising;
   an elongated tubular tool support having a longitudinal axis and having an upper end, a lower end and a cavity extending at least partially therethrough;
   a tool head supported on the upper end of the tool support and including a cutting blade;
   an actuating line coupled to the tool head and actuatable to move the cutting blade, the actuating line passing through the cavity; and
   an actuating handle coupled to the lower end of the tool support and secured to the tool support for sliding movement along the longitudinal axis, the actuating handle including means for releasably seizing the actuating line in response to a first movement of the actuating handle in a direction away from the tool head and along the longitudinal axis, and means for actuating the cutting blade in response to subsequent movement of the actuating handle in the same direction, wherein the actuating line remains within the tool support throughout the first and second movements.

2. The tool of claim 1, wherein the actuating handle is movable along the tool support, the first and second movement being in a first direction, and wherein the actuating handle is movable in a second direction, opposite to the first direction to disengage the actuating line.

3. The tool of claim 1, wherein the tool support includes a plurality of telescopingly extensible and retractable elements.

4. The tool of claim 1, wherein the means for seizing includes a clutch for automatically seizing a portion of the actuating line in response to the first movement of the actuating handle, the clutch remaining in engagement with the portion of the actuating line throughout the second movement.

5. A tool for performing cutting operations, comprising;

an elongated tubular tool support having a longitudinal axis and having an upper end, a lower end and a cavity extending at least partially therethrough;

a tool head supported on the upper end of the tool support and including a cutting blade;

an actuating line coupled to the tool head and actuatable to move the cutting blade, the actuating line passing through the cavity; and an actuating handle coupled to the lower end of the tool support and secured to the tool support for sliding movement along the longitudinal axis, the actuating handle including an actuating line engagement mechanism for releasably engaging the actuating line, in response to a first movement of the actuating handle in a direction away from the toolhead and along the longitudinal axis, and for actuating the cutting blade, in response to subsequent movement of the actuating handle in the same direction, wherein the actuating line remains within the tool support throughout the first and second movements;

the tool support including a plurality of telescopingly extensible and retractable elements; and a reel mechanism, the reel mechanism collecting the actuating line upon retraction of the elements and dispensing the actuating line upon extension of the elements.

6. A tool for performing cutting operations, comprising:

an elongated, telescopingly extensible and retractable tool support having a longitudinal axis, an upper end, a lower end and a cavity extending at least partially therethrough along the longitudinal axis;

a severing head supported on the upper end of the tool support, the severing head including a blade movable to perform a cutting operation;

an actuating line coupled to the severing head and tensionable to move the blade to perform the cutting operation, the actuating line extending through at least a portion of the cavity toward the lower end;

an actuator being slidingly movable with respect to the tool support the actuator for releasably engaging the actuating line, in response to movement of the actuating handle in a direction away from the tool head and along the longitudinal axis, and for actuating the cutting blade, in response to subsequent movement of the actuator in the same direction; and a reel mechanism disposed proximate to the lower end of the tool support and coupled to the actuating line, the reel mechanism being spring biased to collect the actuating line during retraction of the tool support and to dispense the actuating line during extension of the tool support.

7. The tool of claim 6, wherein the actuator includes a clutch for engaging and tensioning the actuating line for movement of the blade.

8. The tool of claim 7, wherein the reel mechanism is housed in the actuating handle.

9. The tool of claim 6, wherein the actuator is movable with respect to the tool support and includes an actuating line engaging assembly, the engaging assembly engaging the actuating line by a first movement of the actuator and tensioning the actuating line by a second movement of the actuator to move the blade.

10. The tool of claim 9, wherein the actuating line traverses the line engaging assembly between the lower end of the tool support and the reel mechanism.

11. A tool for performing cutting operations, comprising;

an elongated tool support having a longitudinal axis, an upper end, a lower end and a cavity extending therethrough along the longitudinal axis;

a tool head supported on the upper end of the tool support and including a cutting blade;

an actuating line coupled to the tool head and tensionable to move the cutting blade, the actuating line passing through the cavity to the lower end; and an actuating handle coupled to the lower end of the tool support, the actuating handle being slidable with respect to the tool support in a first direction away from the tool head and along the longitudinal axis to releasably engage and tension the actuating line and move the blade to perform a cutting operation, the actuating handle being slidable in a second direction along the longitudinal axis and opposite to the first direction to release the actuating line, the actuating line remaining within the cavity during movement of the actuating handle in the first and second directions;

the tool support including a plurality of telescopingiy extensible and retractable tubes; and a reel mechanism, the reel mechanism collecting the actuating line upon retraction of the tubes and dispensing the actuating line upon extension of the tubes.

12. A cutting tool comprising;

an elongated tubular tool support having a longitudinal axis, an upper end, a lower end and an elongated cavity extending therethrough along the longitudinal axis;

a tool head supported on the upper end of the tool support, the tool head including a stationary portion and a movable portion;

an actuating line coupled to the movable portion of the tool head, the actuating line entering into the elongated cavity of the tool support in a region of the tool support proximate the upper end and extending through the elongated cavity to the lower end thereof; and an actuating handle mounted to the lower end of the tool support and slidable with respect to the tool support along the longitudinal axis thereof, the actuating handle having means for releasably seizing a portion of the actuating line in response to sliding movement of the actuating handle in a direction away from the tool head and along the longitudinal axis, thereby engaging and tensioning the actuating line to move the movable portion of the tool head, and wherein the actuating line remains within the cavity of the tool support throughout sliding movement of the actuating handle.

13. The cutting tool of claim 12, wherein the tool support includes a first tubular portion and a second tubular portion received within and slidable within the first tubular portion to permit extension and retraction of the tool support.

14. The cutting tool of claim 13, further comprising a clamping device secured around the tool support for fixing the first tubular portion in a desired position with respect to the second tubular portion.

15. The cutting tool of claim 12, wherein the acuating handle includes a tubular portion extending substantially along the longitudinal axis and having an inner cavity, the actuating line passing through at least a portion of the actuating handle inner cavity.

16. The cutting tool of claim 12, wherein a lower end of the actuating line is fixed to a portion of the actuating handle.

* * * * *

UNITED STATES PATENT AND TRADEMARK OFFICE
CERTIFICATE OF CORRECTION

PATENT NO. : 6,345,445 B1
DATED : February 12, 2002
INVENTOR(S) : Robert T. Schofield and Ernest D. Labarre It is certified that error appears in the above-identified patent and that said Letters Patent is hereby corrected as shown below:

<u>Title page,</u>
Item [75], Inventor, after "Robert T. Schofield, Madison, WI (US)", please insert -- Ernest D. Labarre, Waunakee, WI (US) --.

<u>Column 9,</u>
Line 41, after "tool" please insert -- support along the longitudinal axis thereof, --.

Signed and Sealed this

Ninth Day of March, 2004

JON W. DUDAS
*Acting Director of the United States Patent and Trademark Office*